United States Patent [19]
Yokoyama

[11] Patent Number: 4,947,406
[45] Date of Patent: Aug. 7, 1990

[54] COMMUNICATION INTERFACE

[75] Inventor: Tatuo Yokoyama, Nara, Japan

[73] Assignee: Sharp Kabushiki Kaisha, Osaka, Japan

[21] Appl. No.: 89,142

[22] Filed: Aug. 25, 1987

[30] Foreign Application Priority Data

Aug. 29, 1986 [JP] Japan .................................. 61-204845

[51] Int. Cl.⁵ .......................................... H04L 25/10
[52] U.S. Cl. .......................................... 375/7; 375/36; 307/475
[58] Field of Search .................... 375/36, 37, 17, 121, 375/7; 340/870.4; 178/69 R, 3, 69 C, 69 D; 307/475; 330/258

[56] References Cited
U.S. PATENT DOCUMENTS

| | | | |
|---|---|---|---|
| 3,290,653 | 12/1966 | Slattery et al. | 375/36 |
| 3,302,035 | 1/1967 | Greene | 375/36 |
| 4,495,626 | 1/1985 | Brunin et al. | 375/19 |
| 4,649,291 | 3/1987 | Konishi | 307/270 |

Primary Examiner—Benedict V. Safourek
Assistant Examiner—Marianne Huseman
Attorney, Agent, or Firm—Flehr, Hohbach, Test, Albritton & Herbert

[57] ABSTRACT

A communication interface for connection to a communication apparatus provided with a balanced-type interface circuit includes a circuit for outputting a constant voltage approximately at the middle of the voltage level of transmitted data signals and is adapted to transmit to a balanced-type receiver contained in the communication apparatus a data signal as one input and the constant voltage from the constant-voltage circuit as another input.

4 Claims, 3 Drawing Sheets

FIG.—1

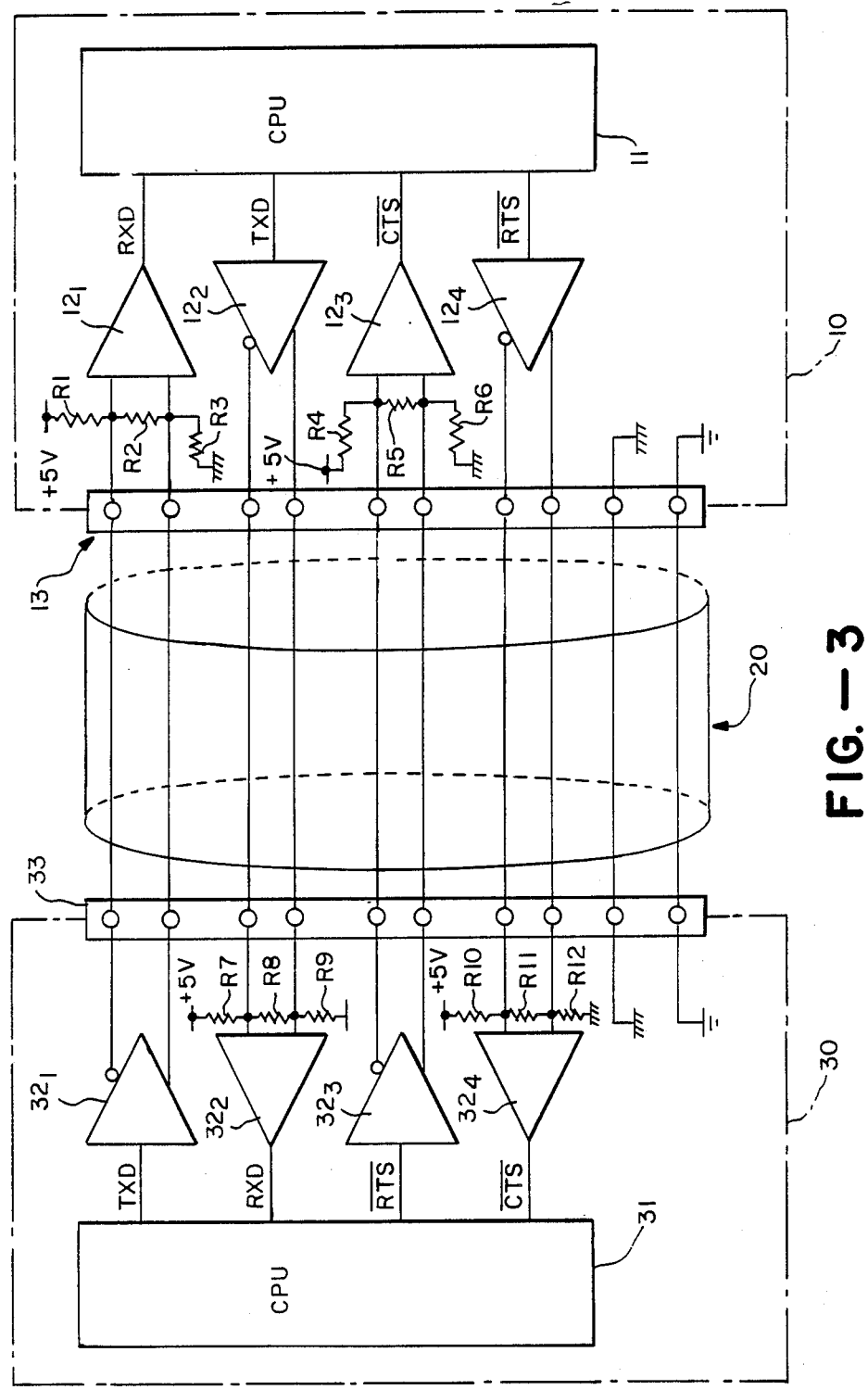
FIG.—3

COMMUNICATION INTERFACE

BACKGROUND OF THE INVENTION

This invention relates to a communication interface and more particularly to a communication interface of a simple structure for a device adapted to be connected to an apparatus provided with a communication port comprising a balanced-type interface circuit.

An apparatus having a standard RS422 communication port may be considered an example of apparatus provided with a balanced-type interface circuit. RS422 is an interface standard established mainly by the United States Electronic Industries Association (EIA) and a data communication system based on the RS422 standard is schematically described in FIG. 3 wherein numberal 10 indicates a communication apparatus provided with an RS422 communication port and numeral 30 indicates a peripheral device to be connected to the communication apparatus 10 through a communication cable 20. The communication apparatus 10 includes a central processing unit CPU 11, which controls the overall operation thereof, balanced-type receivers $12_1$ and $12_3$ and balanced-type drivers $12_2$ and $12_4$, the receivers $12_1$ and $12_3$ and the drivers $12_2$ and $12_4$ forming a communication interface circuit of the apparatus 10. The peripheral device 30 likewise includes a CPU 31 which controls the overall operation thereof, and also drivers $32_1$ and $32_3$ and receivers $32_2$ and $32_4$ form pairs with those in the interface circuit of the communication apparatus 10 and also comprise together a communication interface circuit of the peripheral device 30. Groups of resistors $R_1$, $R_2$, and $R_3$, $R_4$, $R_5$ and $R_6$, $R_7$, $R_8$ and $R_9$, and $R_{10}$, $R_{11}$ and $R_{12}$ are connected respectively to the input end of the receivers $12_1$, $12_3$, $32_2$ and $32_4$ to form so-called fail-safe circuits for preventing instability of the input signals to the receivers $12_1$, $12_3$, $32_2$ and $32_4$ when the transmission line has been broken unexpectedly by an accident or the connector has become disengaged. Numeral 13 indicates a connector for connecting the communication interface circuit of the apparatus 10 to cable 20. Since at least about ten signal lines are required for RS422 communication, a D-type subconnector with 25 pins is usually used as the connector 13. Numeral 33 indicates another connector for connecting the communication interface circuit of the peripheral device 30 to the cable 20. A D-type subconnector with 25 pins is similarly used for this purpose.

Communication between the devices described above is explained next by way of FIG. 4. In FIG. 4, charts (a)-(d) relate to the communication apparatus 10 and charts (e)-(h) relate to the peripheral device 30. With respect to FIG. 3, the $\overline{RTS}$ terminal of the CPU 11 for the apparatus 10 is for requesting transmission of a signal and it is normally in an active condition (or in "L" level) as shown in FIG. 4(a). Charts (a), (b), etc. in FIG. 4 are hereinafter referred to as FIG. 4(a), FIG. 4(b), etc., respectively, for convenience. The $\overline{RTS}$ signal (that is, the signal transmitted from the $\overline{RTS}$ terminal) is transmitted to the peripheral device 30 from the driver $12_4$ through the cable 20. The $\overline{RTS}$ signal thus transmitted is received by the receiver $32_4$ of the peripheral device 30 and is applied to the $\overline{CTS}$ terminal of the CPU 31 to indicate that communication can now be started. Thus, as shown in FIG. 4(f), the $\overline{CTS}$ terminal is normally also in an active condition (or in "L" level) and a data signal is transmitted from the TXD terminal, which is a data output terminal, of the CPU 31 when the $\overline{CTS}$ terminal is in an active condition as shown in FIG. 4(g). This data signal is transmitted from the driver $32_1$ through the cable 20 to the communication apparatus 10 and is received as shown in FIG. 4(d) by the receiver $12_1$ of the apparatus 10 to be applied to the RXD terminal which is a data-receiving terminal of the CPU 11.

When the peripheral device 30 makes a request for transmission of a signal from the communication apparatus 10, the $\overline{RTS}$ terminal, which is a transmission-requesting terminal of the CPU 31 on the side of the peripheral device 30 becomes active as shown in FIG. 4(e). This $\overline{RTS}$ signal is transmitted from the driver $32_3$ through the cable 20 to the communication apparatus 10 and received by its receiver $12_3$ to be applied as shown in FIG. 4(b) to the $\overline{CTS}$ terminal of the CPU 11 for indicating that communication can now be started. The CPU 11 outputs data signals from its TXD terminal as shown in FIG. 4(c) while its $\overline{CTS}$ terminal is in an active condition. The signal thus transmitted is received by the receiver $32_2$ of the peripheral device 30 to be applied to the RXD terminal of the CPU 31 as shown in FIG. 4(h).

Data transmission between devices provided with such balanced-type interface circuits suffers less from the effects of noise than similar data transmission between devices with interface circuits of known types and hence is better suited for long-distance communications. In order to connect a communication apparatus provided with a balanced-type interface circuit with a peripheral device, however, such a peripheral device must also have an interface circuit of the RS422 type. Unfortunately, RS422 interface circuits are structurally complicated and they are expensive even if dedicated ICs are used. Where the distance to the peripheral device with which only simple communications are to be made is small and the effects of noise are not important, in particular, it is not economical to convert the interface circuits of peripheral devices into balanced-type ones simply because the principal communication apparatus happens to have a balance-type interface circuit such as RS422.

SUMMARY OF THE INVENTION

It is therefore an object of the present invention to provide a relatively simple way of forming an interface circuit of a peripheral device to be connected to a communication apparatus having a communication port with a balanced-type interface circuit.

The above and other objects are achieved by an interface circuit of the present invention for connecting to a communication apparatus equipped with a balance-type interface circuit. According to the present invention, such an interface circuit is provided with a constant-voltage circuit for outputting a constant voltage approximately in the middle of the voltage level of transmitted data signals and applies transmitted data signals to one of the input terminals of a balanced-type receiver in the interface circuit of the communication apparatus for receiving data and the constant voltage output from this constant-voltage circuit to the other input terminal. In circuits of conventional types, the two input signals received by the balanced-type receiver of the communication apparatus are differentiated. According to the present invention, by contrast, since a constant voltage approximately in the middle of the signal level is applied as one of the inputs to the balanced-type receiver, it is sufficient to transmit a data signal to one of the receiver terminals. Consequently, there is no need to provide a balanced-type interface circuit to the peripheral device for outputting a differential signal.

BRIEF DESCRIPTION OF THE DRAWINGS

The accompanying drawings, which are incorporated in and form a part of the specification, illustrate an embodiment of the present invention, and together with the description, serve to explain the principles of the invention. In the drawings:

FIG. 3 is a circuit diagram of a part of a conventional communication interface.

DETAILED DESCRIPTION OF THE INVENTION

Figure 1:
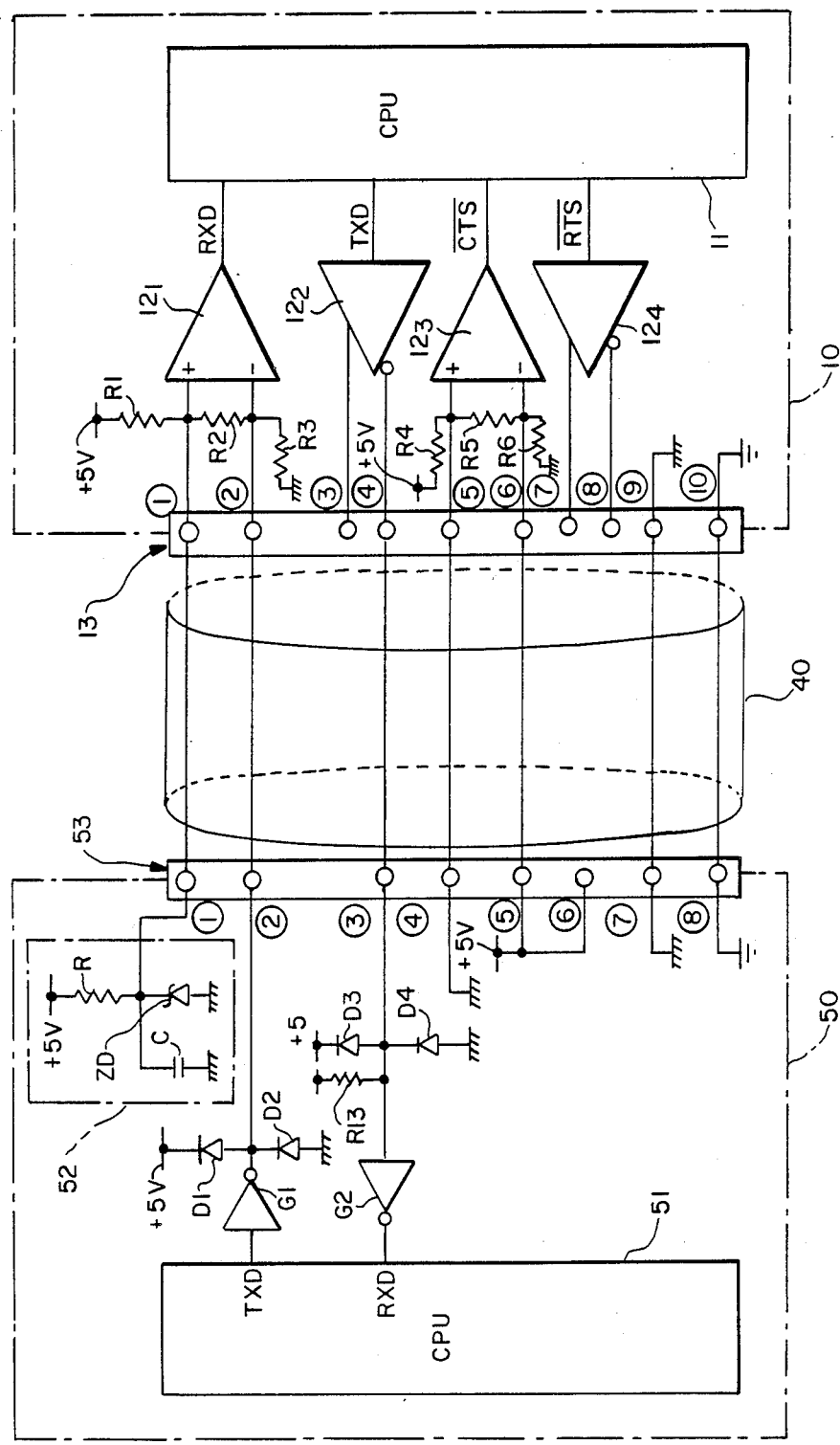
FIG. 1 is a circuit diagram of a part of a communication interface of the present invention.

With reference to FIG. 1 wherein components which are identical or equivalent to those shown in FIG. 3 are indicated by the same numerals and not explained again, a peripheral device 50 to be connected to the communication apparatus 10 by a communication cable 40 comprises a central processing unit CPU 51 for the overall control of the device 50, a modular 8-pin connector 53 and an interface circuit between the CPU 51 and the connector 53. The aforementioned interface circuit of the peripheral device 50 includes inverter circuits G1 and G2 connected respectively to the TXD terminal and the RXD terminal of the CPU 51, diodes D1–D4 for protecting the input signals to the circuits G1 and G2, a fail-safe resistor $R_{13}$ for preventing instability from occurring in the input signal to the inverter circuit G2 when the transmission line is broken unexpectedly by an accident or the connector becomes disengaged, and a constant-voltage circuit 52 including a capacitor, a zener diode and a resistor.

The output voltage of the constant-voltage circuit 52 is adjusted to about 2.5V which is approximately the middle value of the transmitted data signal level (0–5V) such that the noise margin of the communication system will be high. Since the condenser is provided in the constant-voltage circuit 52 for the purpose of removing ripples, it can be dispensed with in situations where the ripple components present no problems.

The output terminal of the constant-voltage circuit 52 is connected to the first pin of the connector 53. The output terminal of the inverter circuit G1 is connected to the second pin. The input terminal of the inverter circuit G2 is connected to the third pin. The fourth pin of the connector 53 is grounded. The fifth and sixth pins are connected to a source line at 5V, the seventh pin is connected to a source line at 0V and the eighth pin is grounded.

Figure 2:
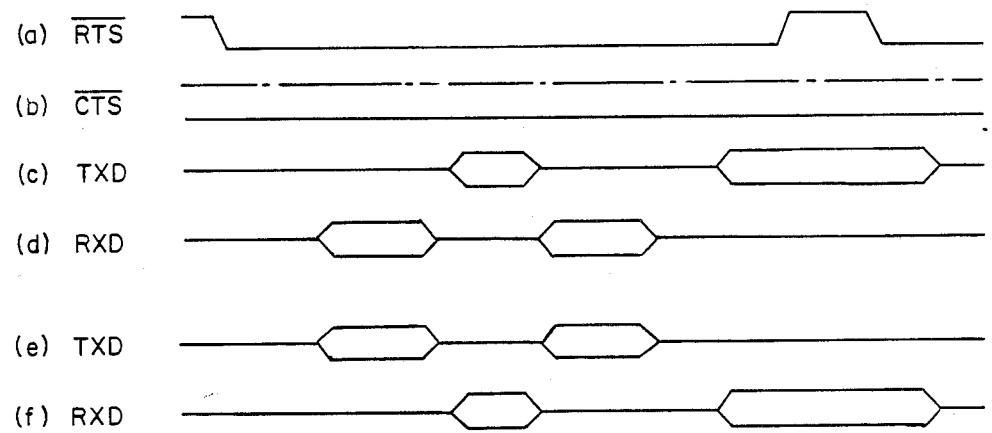
FIG. 2 is a timing chart for transmission of signals through the interface of FIG. 1.
Figure 4:
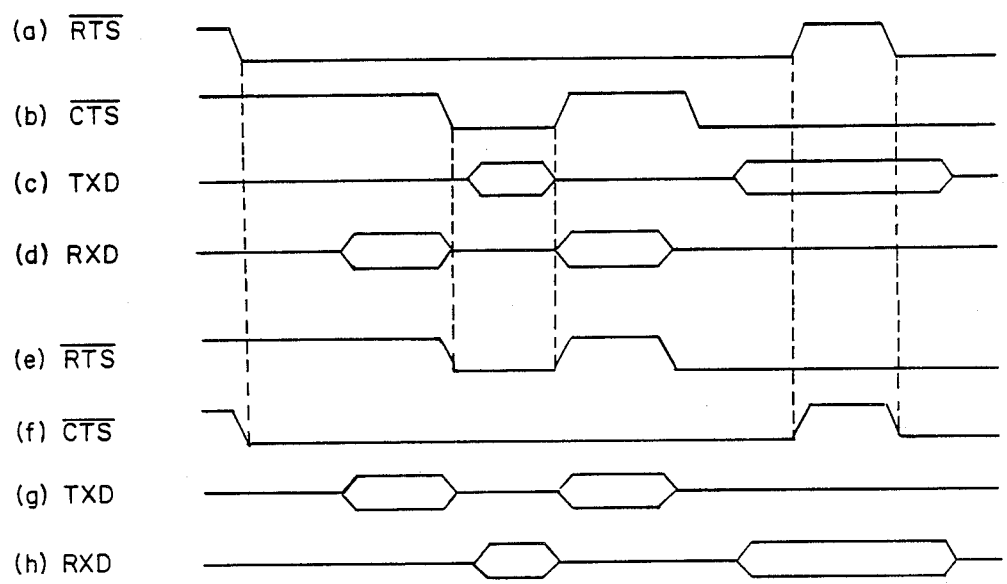
FIG. 4 is a timing chart for transmission of signals through the interface of FIG. 3.

The first, second, third, fourth, fifth, seventh and eighth pins of the connector 53 are connected through the cable 40 respectively to the first, second, fourth, fifth, sixth, ninth and tenth pins of the connector 13. The third, seventh and eighth pins of the connector 13 are left open. The seventh pin of the connector 53 and the ninth pin of the connector 13 are set to the signal ground which serves as the reference voltage to signals. The eighth pin of the connector 53 and the tenth pin of the connector 13 are set to the frame ground which serves as the grounding for the housing. The connection described above by way of FIG. 1 is explained next by way of the timing chart of signal transmission in FIG. 2. Charts (a)–(d) of FIG. 2 (hereinafter referred to as FIGS. 2(a)–(d), respectively, for convenience) relate to the communication apparatus 10 and charts (e) and (f) (hereinafter referred to as FIGS. 2(e) and (f), respectively, for convenience) relate to the peripheral device 50.

Since the fourth pin of the connector 53 of the peripheral device 50 is grounded and the fifth pin is maintained at 5V, the output from the receiver $12_3$ of the communication apparatus 10 is always in "L" level. Thus, the $\overline{CTS}$ terminal of the CPU 11 is always in "L" level as shown in FIG. 2(b) and hence the communication apparatus 10 is always capable of transmitting a signal. If a TXD signal in "H" level is outputted from the CPU 11 with the timing shown by FIG. 2(c), for example, the negative output from the driver $12_2$ becomes "L". This negative output is transmitted through the cable 40 to the peripheral device 50 and inverted by the inverter circuit G2 and, as a result, a data signal in "H" level is received by the RXD terminal of the CPU 51 of the peripheral device 50 with the timing shown by FIG. 2(f). When a TXD signal in "L" is outputted from the CPU 11, a data signal in "L" level is similarly inputted at the RXD terminal of the CPU 51 of the peripheral device 50.

When peripheral device 50 thus receives such a transmitted data signal, it decides by its internal control whether a data signal should be transmitted to the communication apparatus 10. It is for this purpose that the output terminal of the driver $12_4$ for transmitting $\overline{RTS}$ signals from the communication apparatus 10 is not connected to the peripheral device 50. In other words, although a $\overline{RTS}$ signal as shown in FIG. 2(a) is outputted from the $\overline{RTS}$ terminal of the communication apparatus 10, this $\overline{RTS}$ signal is not transmitted to the peripheral device 50 because the peripheral device 50 itself determines whether it should be transmitted to the communication apparatus 10 or not.

Next, the data signal transmission from the peripheral device 50 to the communication apparatus 10 is explained. When a TXD data signal in "H" level (5V) is outputted from the CPU 51 of the peripheral device 50 with the timing of FIG. 2(e), it is inverted by the inverter circuit G1 and a data signal in "L" level (at 0V) is transmitted to the communication apparatus 10 through the cable 40, and this "L" level data signal is applied as the negative input to the receiver $12_1$ of the communication apparatus 10. On the other hand, the constant-voltage output from the constant-voltage circuit 52 is applied to the aforementioned receiver $12_1$ as positive input. Since the positive input to the receiver $12_1$ thus becomes larger than its negative input, the receiver $12_1$ outputs a signal in "H" level and this signal is applied to the RXD terminal of the CPU 11 with the timing shown by FIG. 2(d). In situations where the TXD signal is in "L" level, on the other hand, this signal is inverted by the inverter circuit G1 and a signal in "H" level is transmitted and applied to the receiver $12_1$ as negative input. As a result, the negative input of the receiver $12_1$ becomes greater than its positive input, and a signal in "L" level is outputted from the receiver $12_1$ to be applied to the RXD terminal of the CPU 11. This is how data signals outputted from the peripheral device 50 are transmitted to the communication apparatus 10.

In the example described above, in summary, the peripheral device 50 applies a constant voltage of 2.5V as positive input to the receiver 12₁ of the communication apparatus 10 such that data signals can be transmitted to the communication apparatus 10 without producing a differential signal. Accordingly, there is no need to use a differential driver in the interface circuit of the peripheral device 50. Thus, the interface circuit for the peripheral device 50 can be of a very simple structure.

It is also to be noted in the example explained above, that a predetermined voltage is constantly applied from the peripheral device 50 to the receiver 12₃ of the communication apparatus 10 such that communication can be started at any time and that the communication apparatus 10 transmits only one output signal from the driver 12₂. When data signals are transmitted from the peripheral device 50 to the communication apparatus 10, on the other hand, they do not depend on the $\overline{RTS}$ signal from the communication apparatus 10 but on the internal control of the peripheral device 50 itself. Consequently, the number of communication lines in the cable 40 between the communication apparatus 10 and the peripheral device 50 can be reduced and so can the number of pins in the connector 53 of the peripheral device 50. Thus, where a large D-subconnector with 25 pins had to be used conventionally for connecting a peripheral device to a communication apparatus equipped with an RS422 communication port, the present invention allows the use of a relatively smaller modular 8-pin connector. This means that the peripheral device 50 can be made smaller according to the present invention.

The foregoing description of a preferred embodiment of the invention has been presented for purposes of illustration and description. It is not intended to be exhaustive or to limit the invention to the precise form disclosed, and obviously modifications and variations are possible in light of the above teaching. For example, the inverter circuits G1 and G2 provided above as buffers for data transmission are not always required. The TXD signal outputted from the CPU 51 may be transmitted directly to the communication apparatus 10 or the TXD signal transmitted from the communication apparatus 10 may be directly taken into the CPU 51.

In summary, a communication interface according to the present invention does not require a differential driver for data transmission in the interface circuit of the peripheral device. Instead, a constant-voltage circuit of a simple structure is provided for transmitting data signals to a communication apparatus with a balanced-type interface circuit. Any modifications and variations that may be apparent to a person skilled in the art are intended to be included within the scope of this invention.

What is claimed is:

1. A communication interface comprising
a first apparatus which receives and transmits data respectively by voltage difference between two lines,
a second apparatus which receives and transmits binary data, and
a cable which connects said first and second apparatus and serves to transfer data therethrough between said first and second apparatus,
said first apparatus having an interface circuit which includes
a receiver circuit with two input terminals for receiving data addressed to said first apparatus as voltage differences at said input terminals,
a transmitter circuit with two output terminals for transmitting data from said first apparatus as voltage differences at said output terminals, and
a first grounding terminal,
said second apparatus including
an output gate which is connected through said cable to one of said two input terminals of said receiver circuit and serves to output binary data signals,
a constant-voltage circuit which is connected through said cable to the other of said two input terminals of said receiver circuit and serves to output a predetermined constant voltage,
an input gate which is connected through said cable to one of said two output terminals of said transmitter circuit, and
a second grounding terminal which is connected through said cable to said first grounding terminal.

2. The communication interface of claim 1 wherein said constant voltage is approximately in the middle between the voltage levels of said binary data signals.

3. The communication interface of claim 1 wherein said second apparatus includes a central processing unit.

4. The communication interface of claim 1 wherein said second apparatus includes an invertor circuit and a fail-safe resistor for preventing instability of input signals to said invertor circuit.

* * * * *